United States Patent
Hellat et al.

(10) Patent No.: US 6,679,060 B2
(45) Date of Patent: Jan. 20, 2004

(54) METHOD FOR OPERATING A PREMIX BURNER

(75) Inventors: Jaan Hellat, Baden-Rütihof (CH); Frank Reiss, Lauchringen (DE); Pirmin Schiessel, Unterehrendingen (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/002,137

(22) Filed: Dec. 5, 2001

(65) Prior Publication Data

US 2002/0178733 A1 Dec. 5, 2002

(30) Foreign Application Priority Data

Dec. 16, 2000 (DE) .......................... 100 62 904
Apr. 20, 2001 (DE) .......................... 101 19 526

(51) Int. Cl.$^7$ .................................. F02C 3/30
(52) U.S. Cl. ..................... 60/775; 60/39.3; 60/725
(58) Field of Search .................. 60/39.3, 39.55, 60/725, 775

(56) References Cited

U.S. PATENT DOCUMENTS

| | | | | |
|---|---|---|---|---|
| 2,469,679 A | * | 5/1949 | Wyman ............... | 60/39.3 |
| 4,214,435 A | * | 7/1980 | Campbell ............ | 60/775 |
| 4,259,837 A | * | 4/1981 | Russell et al. ........ | 60/775 |
| 5,220,786 A | | 6/1993 | Campbell | |
| 6,470,688 B2 | * | 10/2002 | Blatter et al. ........ | 60/39.3 |

FOREIGN PATENT DOCUMENTS

| | | |
|---|---|---|
| DE | 195 20 292 A1 | 12/1996 |
| EP | 0 314 112 A1 | 5/1989 |
| EP | 0 321 809 B1 | 6/1989 |
| EP | 0 590 829 A2 | 4/1994 |
| EP | 0 780 629 A2 | 6/1997 |
| EP | 0 945 677 A2 | 9/1999 |
| JP | 55014926 A | 2/1980 |
| JP | 55137423 A | 10/1980 |
| WO | WO 93/17279 | 9/1993 |
| WO | WO 99/46484 | 9/1999 |
| WO | WO 00/14451 | 3/2000 |

* cited by examiner

Primary Examiner—Louis J. Casaregola
(74) Attorney, Agent, or Firm—Burns, Doane, Swecker & Mathis, L.L.P.

(57) ABSTRACT

In a method for operating a premix burner a water quantity is introduced into at least one of the burner and the reaction zone of the burner depending on at least one command variable formed from at least one measured value. The method can also be used if a burner is operated dry, i.e., without water injection for nitrogen oxide injection, and the injected water quantity is less than 20% of the fuel quantity. The method can be used advantageously especially if a characteristic value derived from combustion pulsations or material temperatures is used as a command variable. The method enables measured parameters to be kept below a permissible upper limit.

16 Claims, 1 Drawing Sheet

METHOD FOR OPERATING A PREMIX BURNER

FIELD OF THE INVENTION

The invention relates to a gas turbine operated with premix burners and the operation of a premix burner.

BACKGROUND OF THE INVENTION

Premix burners are widely used in the operation of firing systems and, in particular, gas turbines. Such premix burners are known, for example from EP 321 809, EP 780 629, WO 93/17279, or EP 945 677. These burners are suitable for operation with liquid as well as gaseous fuels. A mutual characteristic of the burners disclosed in the cited documents is that combustion air is mixed in an inner chamber of the burner with a fuel as much as possible. The combustion air is frequently fed into the inner chamber of the burner tangentially. The eddy current induced in this way bursts open when exiting the burner opening. This so-called "vortex breakdown" generates a recirculation zone where a flame can be stabilized in a purely aerodynamic manner without attaching thermally sensitive, mechanical flame holders. By premixing air and fuel, these burners can be operated principally while avoiding stoichiometric zones, which—at least during operation with gas—easily permits operation with very low emission values without any further measures.

When using liquid fuels, the premixing is relatively incomplete, so that in this case, a diffusion flame is actually present. Such burners are also referred to as premix burners below, since this term has become established for the cited burner types in the expert community. Premix burners operated with liquid fuel are frequently also operated additionally with steam or water injection so that relatively low emission values can be achieved, in particular with respect to nitrogen oxide emissions (these are values of less than 50 ppm).

An inert medium is introduced into the flame, which reduces both the flame temperature and therefore the nitrogen oxide production. When used in gas turbine combustors and with an injection of water, the injected quantity of water is approximately in the same magnitude as the quantity of fuel; the ratio of the quantity of water to fuel is roughly in the range from 0.7 to 2 in order to achieve a corresponding nitrogen oxide reduction. The corresponding operating concepts are adjusted in measuring series, and the quantity of water or, respectively, the ratio of the quantity of water to fuel, is determined depending on the operating conditions of the machine. With such an operation, the cited quantities of water naturally result in a high consumption of correspondingly prepared, demineralized water.

In the same way, for example, in a gas turbine equipped with premix burners, emission values that are clearly below those of gas turbines with standard burners with a so-called dry operation, i.e., without targeted introduction of water for nitrogen oxide reduction, can also be achieved during operation without water injection. Especially in arid regions, where, for example, no infrastructure for gas is present, or oil is especially readily available, gas turbines with premix burners, for example, so-called EV or AEV burners are operated in "dry" oil operation, i.e., there is no nitrogen oxide reduction by injection of water.

The statements made for oil naturally also apply for operation with other liquid fuels.

The burners are generally also operated dry during premix operation with gas, whereby the dry operation of the burners within the framework of the present application should be understood to mean that no water or steam is introduced into the combustion zone in large quantities in a targeted manner for nitrogen oxide reduction.

In practice, it has been found that in the large operating range, whereby in addition to the greatly varying parameters of temperature and pressure of the combustion air, primarily the thermal power turnover of a burner and the impulse ratio of fuel and air, as well as the ratio of the axial impulse to the rotating impulse of the burner flow must be mentioned, combustion instabilities occur that may result in undesired combustion pulsations. The position of the flame also changes. If the flame is stabilized too close to the burner mouth, this may result in temperature increases and an associated reduction in life span of the burner.

SUMMARY OF THE INVENTION

A method of operating a premix burner according to the invention includes introducing, in a targeted manner, a quantity of water depending on a command variable which is calculated from at least one measured operating parameter. In particular, this has the effect of varying the axial impulse of the burner flow in a targeted manner and independently from other operating parameters, such as the fuel quantity, and in this manner enabling independent shifting of the location of the flame stabilization within certain limits.

Within the framework of this disclosure of the invention, the term command variable means a dimension, depending on which the quantity of water that is introduced is adjusted.

In a preferred variation of the process, the burner is operated dry, i.e., without water injection for nitrogen oxide reduction. The introduced quantity of water is kept as low as possible, if at all possible at less than 20% of the quantity of the fuel. Preferably, it is attempted to limit the quantity of water to less than 10%, and even more preferably, less than 5%, of the quantity of the fuel.

During "wet" operation of a premix burner according to the method of the invention, i.e., during operation with water injection for reducing the nitrogen oxide, the process-specific variation of the quantity of the water is analogously kept in an advantageous manner to less than 20% of the fuel quantity. Preferably, it is attempted to limit the process-specific variation of the quantity of water to less than 10%, and even more preferably, less than 5%, of the quantity of the fuel.

This method can be used advantageously for operating the burner with liquid fuel.

In a preferred embodiment of the invention, the combustion pulsations present at least one measured value or parameter. As a command variable, for example, a summation value can be formed from this, or an amplitude peak of a frequency spectrum of the pulsations can be used as a command variable. Furthermore, one or more frequency ranges of the spectrum of the combustion pulsations also can be used to form the command variable.

In another preferred variation, at least one temperature is measured, in particular a material temperature of the premix burner, in order to form a command variable. In the same way, a signal of an optical sensor can be used. This would make it possible, for example, to obtain an indication of the flame position, which would be used as a command variable.

The water quantity adjustment introduced into the burner advantageously can be operated in a closed control circuit in order to adjust a command variable to a desired value, maintain it within a desired interval, or limit it to an upper or lower limit.

The quantity of water can be added via nozzles of the burner. It is also possible to mix the quantity of water prior to the injection of a liquid fuel into the combustor with the liquid fuel and in this way to operate the burner with a water-in-fuel emulsion.

The quantity of water either can be easily controlled simply depending on the command variable. On the other hand, the quantity of water also can be operated in a closed control circuit with the command variable as a regulating variable in order to keep, for example, pulsations or material temperatures below an upper limit or in order to achieve a desired value of the flame position.

The invention is explained in more detail below with the help of exemplary embodiments in reference to the drawing.

DETAILED DESCRIPTION OF THE PREFERRED EMBODIMENTS

Figure 1:
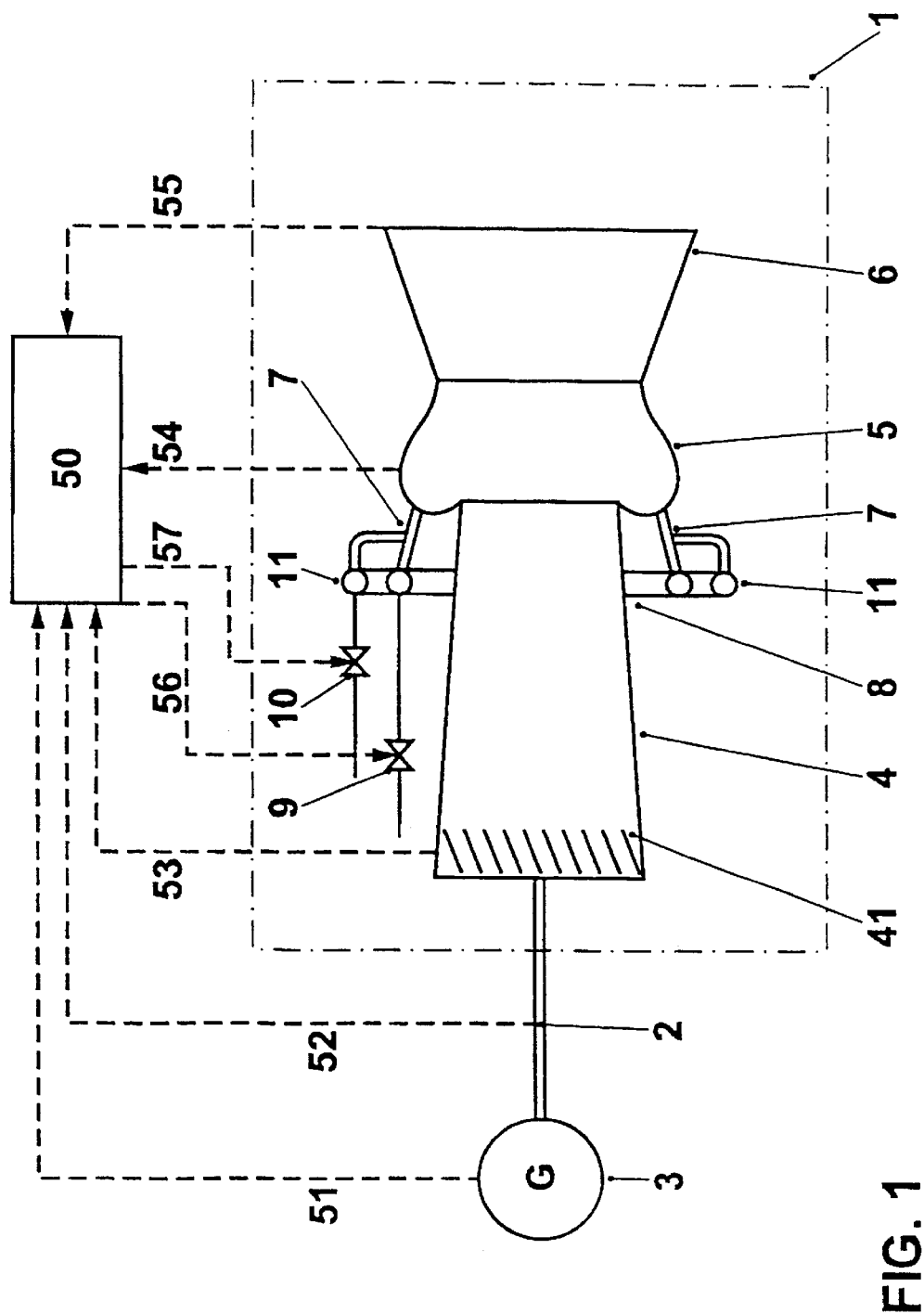
FIG. 1 illustrates a simplified gas turbine system prepared for performing the method according to the invention.

FIG. 1 is a schematic drawing showing a simple gas turbo-set 1 including a compressor 4, a combustor 5, and a turbine 6. The gas turbo-set drives a generator 3 via a shaft 2. Naturally, the gas turbo-set also could have several turbines and/or partial compressors arranged consecutively on one or several shafts. In the same way, a further combustor could be arranged between two turbines or an intermediate cooler between partial compressors, without this influencing the basic concept of the invention.

The combustor 5 constructed as a ring combustor is provided with a plurality of premix burners 7 distributed over the circumference, of which premix burners only the burner lance is shown in the drawing. The burners are connected via the fuel lances with one or more ring lines 8, through which the operating media, in particular fuel, are supplied. On the one hand, a burner may have several supply lines, and individual ring lines also may selectively supply individual burner groups. The performance of the gas turbo-set is determined in a first approximation by the quantity of fuel added.

An adjustable advance guide row 41 of the compressor is used to vary the air mass flow over the entire load range to be covered. The gas turbine system is provided with a plurality of measuring points that enable the monitoring of the operating states or parameters and regulation of the gas turbo-set during operation. The measuring signals are gathered in a central control module 50. The drawing shows examples of signal lines 51, 52, 53, 54, 55. From these signals, physical values are calculated in the control module, and from them, command variables for controlling the gas turbo-set are formed.

In FIG. 1, a signal line 56 extends, as an example, from the control module 50 to a fuel quantity adjusting element 9, so that, for example, depending on a control variance of the generator performance or speed, the fuel mass flow is reduced or increased via this adjusting element.

The lances of the burners 7 are connected in the figure with another ring line 11. Through this ring line, water is fed to the burners. The water quantity is set through the water quantity adjusting element 10. The water quantity adjusting element is controlled by the control module 50 via a signal line 57. The water quantity can be injected via nozzles of the burners directly into the burners. On the other hand, the water can be mixed via mixers with the liquid fuel and the burners can be operated with a water-in-liquid fuel emulsion.

The opening and closing instructions are generated depending on the current operating states inside the control module. From the plurality of measured values combined in the control module, selected values are calculated with each other to form a command variable for the water quantity to be injected. The water quantity can be controlled simply depending on a command variable in an open control loop. For example, the water quantity can be specified simply as a function of the current, relative performance of the gas turbo-set.

The control of the water quantity can also be performed in a closed loop control in order to keep pulsations or burner temperatures below a permissible maximum value. In another embodiment, optical sensors detect the location of the combustion zone in front of the burner opening. The water injection then can be used to adjust the flame position to a desired value.

This enumeration of possible operating modes of the method according to the invention is not complete; one skilled in the art will be able to implement a number of variations of the method according to the invention without difficulty.

What is claimed is:

1. A method of operating a premix burner, comprising the steps of measuring at least one value selected from the group of: combustion pulsations, at least one material temperature of the burner, and a flame position;

introducing a fuel quantity through the burner;

introducing a water quantity into one of the burner or the burner reaction zone;

adjusting the water quantity depending on the at least one measured value; and adjusting the water quantity independent of the fuel quantity.

2. A method of operating a premix burner, comprising the steps of measuring at least one value selected from the group of: combustion pulsations, at least one material temperature of the burner, and a flame position;

introducing a fuel quantity through the burner;

introducing a water quantity into one of the burner or the burner reaction zone;

adjusting the water quantity depending on the at least one measured value; and limiting the water quantity to less than 20% of the fuel quantity.

3. The method as claimed in claim 1, the step of measuring the combustion pulsations further comprising the step of determining a sum level of combustion pulsations and adjusting the water quantity depending on said sum level.

4. The method as claimed in claim 1, the step of measuring the combustion pulsations further comprising the step of determining at least one amplitude of a frequency spectrum of the combustion pulsations and adjusting the water quantity depending on said at least one amplitude.

5. The method as claimed in claim 1, the step of measuring the combustion pulsations further comprising the step of determining the combustion pulsations within a specific frequency range and adjusting the water quantity depending on said combustion pulsations within a specific frequency range.

6. The method as claimed in claim 1, the step of measuring the flame position further comprising the step of measuring the signal of an optical sensor.

7. The method as claimed in claim 1, further comprising the step of supplying the burner with liquid fuel.

8. The method as claimed in claim 1, further comprising the step of introducing the water quantity through nozzles of the burner.

9. The method as claimed in claim 7, further comprising the steps of mixing the water with a liquid fuel prior to supplying the water to the burner; and operating the burner with a water-in-fuel emulsion.

10. The method as claimed in claim 2, the step of measuring the combustion pulsations further comprising the step of determining a sum level of combustion pulsations and adjusting the water quantity depending on said sum level.

11. The method as claimed in claim 2, the step of measuring the combustion pulsations further comprising the step of determining at least one amplitude of a frequency spectrum of the combustion pulsations and adjusting the water quantity depending on said at least one amplitude.

12. The method as claimed in claim 2, the step of measuring the combustion pulsations further comprising the step of determining the combustion pulsations within a specific frequency range and adjusting the water quantity depending on said combustion pulsations within a specific frequency range.

13. The method as claimed in claim 6, the step of measuring the flame position further comprising the step of measuring the signal of an optical sensor.

14. The method as claimed in claim 2, further comprising the step of supplying the burner with liquid fuel.

15. The method as claimed in claim 14, further comprising the steps of mixing the water with a liquid fuel prior to supplying the water to the burner; and operating the burner with a water-in-fuel emulsion.

16. The method as claimed in claim 2, further comprising the step of introducing the water quantity through nozzles of the burner.

* * * * *